US00RE42699E

(19) United States
(12) Reissued Patent
Graber

(10) Patent Number: US RE42,699 E
(45) Date of Reissued Patent: Sep. 13, 2011

(54) SPONTANEOUS SYMMETRICAL WEIGHT SHIFTING DEVICE

(75) Inventor: Jase Graber, Menomonie, WI (US)

(73) Assignee: The Shifter, Inc., Minneapolis, MN (US)

(21) Appl. No.: 12/148,552

(22) Filed: Apr. 18, 2008

Related U.S. Patent Documents

Reissue of:
(64) Patent No.: 7,033,306
Issued: Apr. 25, 2006
Appl. No.: 10/637,972
Filed: Aug. 11, 2003

U.S. Applications:
(60) Provisional application No. 60/418,394, filed on Oct. 9, 2002.

(51) Int. Cl.
*A63B 22/06* (2006.01)
(52) U.S. Cl. ..... 482/57; 482/52; 482/70
(58) Field of Classification Search ..... 482/51, 482/52, 53, 57, 70, 71, 79, 80, 148; 601/29, 601/34, 35
See application file for complete search history.

(56) References Cited

U.S. PATENT DOCUMENTS

| | | | | | |
|---|---|---|---|---|---|
| 4,185,622 | A | | 1/1980 | Swenson | 601/27 |
| 5,199,931 | A | | 4/1993 | Easley et al. | 482/52 |
| 5,242,343 | A | | 9/1993 | Miller | 482/57 |
| 5,338,273 | A | | 8/1994 | Metcalf et al. | 482/70 |
| 5,383,829 | A | * | 1/1995 | Miller | 482/57 |
| 5,423,729 | A | | 6/1995 | Eschenbach | 482/70 |
| 5,529,555 | A | | 6/1996 | Rodgers, Jr. | 482/57 |
| 5,584,780 | A | * | 12/1996 | Lin | 482/51 |
| 5,605,521 | A | * | 2/1997 | Hsieh | 482/51 |
| 5,820,524 | A | * | 10/1998 | Chen | 482/51 |
| 5,833,583 | A | | 11/1998 | Chuang | 482/60 |
| 5,895,339 | A | | 4/1999 | Maresh | 482/51 |
| 5,947,874 | A | | 9/1999 | Dougherty | 482/62 |
| 6,019,710 | A | * | 2/2000 | Dalebout et al. | 482/70 |
| 6,030,320 | A | | 2/2000 | Stearns et al. | 482/57 |
| 6,080,086 | A | | 6/2000 | Maresh et al. | 482/57 |
| 6,123,650 | A | | 9/2000 | Birrell | 482/70 |
| 6,165,107 | A | | 12/2000 | Birrell | 482/70 |
| 6,234,939 | B1 | * | 5/2001 | Moser et al. | 482/63 |
| 6,248,046 | B1 | | 6/2001 | Maresh et al. | 482/57 |
| 6,277,055 | B1 | | 8/2001 | Birrell et al. | 482/52 |
| 6,340,340 | B1 | | 1/2002 | Stearns et al. | 482/52 |
| 6,390,954 | B1 | * | 5/2002 | Lee | 482/52 |
| 6,416,442 | B1 | | 7/2002 | Stearns et al. | 482/52 |
| 6,551,218 | B2 | * | 4/2003 | Goh | 482/52 |

(Continued)

*Primary Examiner* — Loan Thanh
*Assistant Examiner* — Tam Nguyen
(74) *Attorney, Agent, or Firm* — Mark A. Litman & Associates, P.A.

(57) ABSTRACT

A stationary exercise device includes a frame member having a transverse pivot axis. A first and a second foot tread member are operatively associated with a coupling member for pivotally coupling the first end of each foot tread member to [the] *a respective* pivot axis at a predetermined distance from the pivot axis, so that each foot tread member first end travels in an arcuate path about the pivot axis. Each foot tread member moves independently of the other foot tread member. Each foot tread member second end is operatively associated with a glide member for moveable coupling of the second end of each foot tread member to a support surface. The glide members direct each foot tread member second end along a reciprocating path of travel, as each foot tread member first end travels in an arcuate path.

22 Claims, 6 Drawing Sheets

U.S. PATENT DOCUMENTS

2002/0128122 A1* 9/2002 Miller ..... 482/52
2002/0142890 A1* 10/2002 Ohrt et al. ..... 482/52
2004/0132583 A1* 7/2004 Ohrt et al. ..... 482/52
2010/0093499 A1* 4/2010 Ohrt et al. ..... 482/52

* cited by examiner

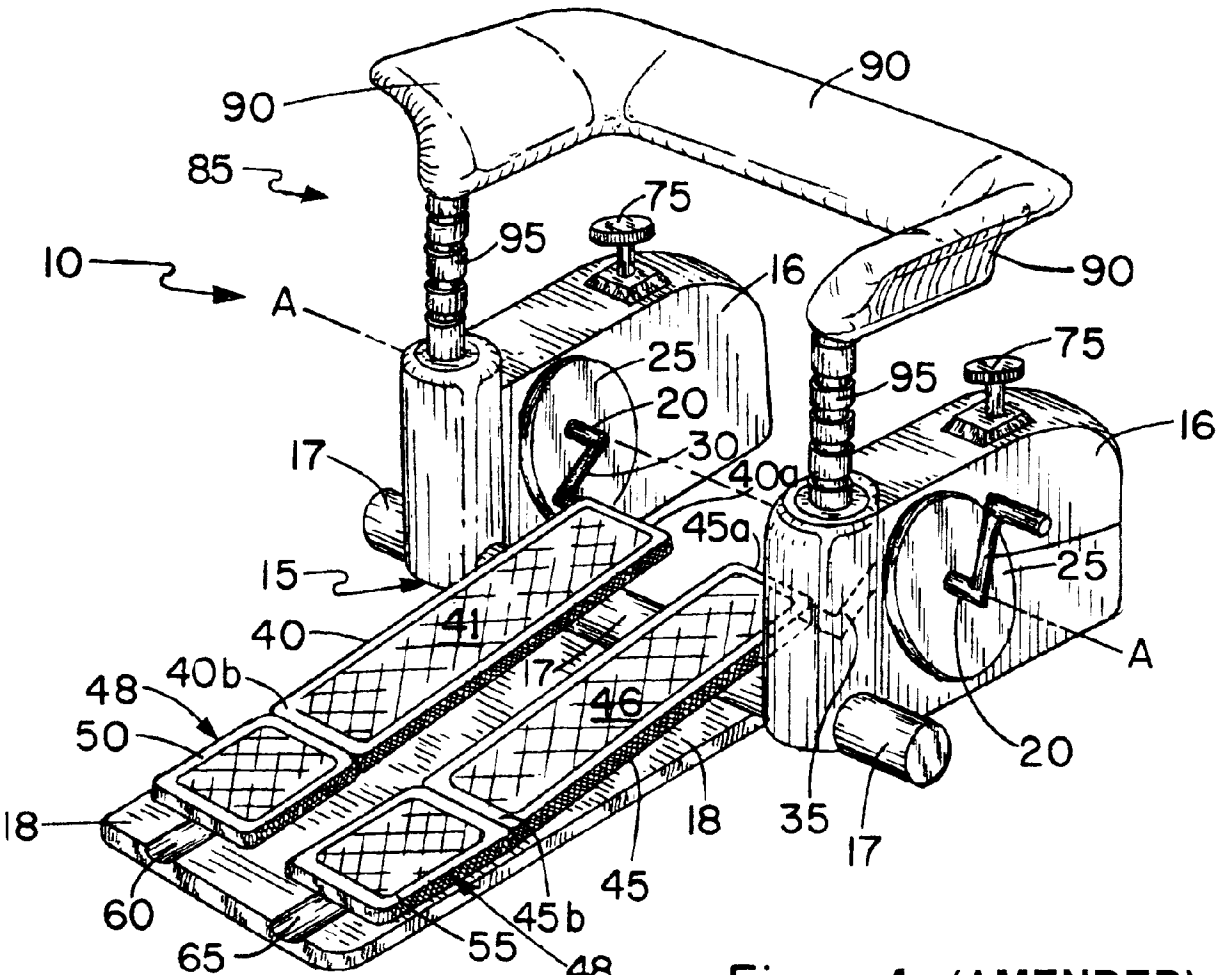
Figure 1 (AMENDED)

SPONTANEOUS SYMMETRICAL WEIGHT SHIFTING DEVICE

Matter enclosed in heavy brackets [ ] appears in the original patent but forms no part of this reissue specification; matter printed in italics indicates the additions made by reissue.

CROSS-REFERENCE TO RELATED APPLICATIONS, IF ANY

This application claims the benefit under 35 U.S.C. §119 (e) of co-pending provisional application Ser. No. 60/418,394, filed 9 Oct., 2002. Application Ser. No. 60/418,394 is hereby incorporated by reference.

STATEMENT REGARDING FEDERALLY SPONSORED RESEARCH OR DEVELOPMENT

Not applicable.

REFERENCE TO A MICROFICHE APPENDIX, IF ANY

Not applicable.

BACKGROUND OF THE INVENTION

1. Field of the Invention

The present invention relates to a device for performing an exercise and, more particularly, to a training device for improving a person's ability to shift their weight from one foot to the other, especially where the training is to assist in spontaneous weight transfer. Also disclosed is a method for operating the exercise device of the present invention.

2. Background Information

Many exercise devices are presently available for a wide variety of exercise and conditioning movements for individuals. An exercise device to assist in training an individual to spontaneously shift weight from one foot to the other is not available. To address this need, the present invention was developed. The device of the present invention improves balance and coordination and provides improved cardiovascular health.

A number of patents concerned with various exercise devices have been granted. These patents include the following:

In U.S. Pat. No. 4,185,622, Swenson discloses a foot and leg exerciser with an inclinable base, at least one foot pad for supporting and moving the foot of the user, and means for moving the foot pads in a pattern to provide mild exercise which simulates normal walking. The heel ends of the foot pads are moved in a vertical plane by revolving cranks driven by an electric motor through reduction gears, while the toe ends of the foot pads are supported on adjustable rocker arms. Starting, stopping and speed of the motor are controllable by the user through a remote control box.

Easley et al., in U.S. Pat. No. 5,199,931, describe an improved exercise machine for simulating stair climbing, and is particularly adapted for in-home use. The device includes a generally upright frame with a base. Right and left foot pedals are pivotally mounted to the base on both sides of the upstanding portion of the frame, respectively, and a handlebar is provided adjacent to the upper end of the frame. The foot pedals are linked to a mechanical resistance element, namely a flywheel. The linkage includes a strap connecting each pedal to a single drive shaft, in turn connected by a belt transmission to the flywheel. A resistance adjustment feature is included in the invention.

In U.S. Pat No. 5,242,343, Miller discloses an exercise device that includes a pair of foot engaging links. The first end of each link is supported for rotational motion about a pivot axis and a second end of each foot link is guided in a reciprocal path of travel. The combination of these foot link motions permits the user's foot to move in an inclined, oval path of travel. This natural foot action exercises a large number of muscles through a wide range of motion. Only a single fly wheel is connected to both foot pads.

Metcalf et al., in U.S. Pat. No. 5,338,273, describe a synchronous/asynchronous exercise machine that is changeable between a synchronous exercise mode wherein a user's limbs, such as his legs, oppositely reciprocate, and an asynchronous exercise mode wherein the user's limbs move independently. The synchronous/asynchronous exercise machine comprises a first movable element for accepting a user's limb, and a second movable element for accepting another limb. A load source against which the user can exercise may also be provided. A first drive belt operatively connects the first movable element to the load source, and a second drive belt operatively connects the second movable element to the load source. A quick change mechanism, which may be connected to the first movable element, is releasably engagable with the second drive belt for changing the synchronous/asynchronous exercise machine between the synchronous exercise mode and the asynchronous exercise mode.

In U.S. Pat. No. 5,423,729, Eschenback discloses an exercise apparatus having a collapsible frame that simulates running and climbing, depending upon where the foot is positioned along the elongated pedal. The user is able to maintain a standing posture while elongated pedals supporting each foot moves through an exercise cycle having a different mode for each foot position that includes translating and nonparallel angular motion generated by a linkage mechanism. Arm exercise is provided by rocker extensions which are phased with the crank to use arm force for moving the crank through dead center positions.

Rogers, Jr., in U.S. Pat. No. 5,529,555, describes a crank assembly for use within an exercising device which promotes cardiovascular exercise yet minimizes impact on critical joints, particularly the ankles and knees. The crank assembly employs a dual coupler system which is interconnected for synchronized rotation. Linkage assemblies are provided which define a predetermined path having a preferred anatomical pattern for foot movement of the user. The crank assembly can be used in an exercising device which promotes leg exercise primarily, or can be combined with two additional linkage assemblies to provide a combined hand motion with leg movement. In this manner, an enhanced cardiovascular workout is provided which minimizes stress on key joints, particularly the ankles and knees.

In U.S. Pat. No. 5,833,583, Chuang discloses an exerciser having a base, two gears secured on the base, and two plates rotatably secured to the base at an axle. Two pinions are rotatably secured to the plates and engaged with the gears. Two foot supports are slidably secured to and movable radially relative to the plates and each foot support has a foot pedal and each has one end secured to the pinions at an eccentric shaft, for allowing the foot pedals to be moved toward and away from the axle and for allowing the foot pedals to be moved along an elliptic moving path when the foot supports are moved radially relative to the plates.

Maresh, in U.S. Pat. No. 5,895,339, discloses an exercise apparatus having a linkage assembly which links rotation of a crank to generally elliptical movement of a foot supporting member. The linkage assembly includes a first link having a first end rotatably connected to a first rocker link, an intermediate portion rotatably connected to the crank, and a second end rotatably connected to a rearward end of the foot supporting member. An opposite, forward end of the foot supporting member is rotatably connected to a second rocker link. An upper distal portion of the second rocker link is sized and configured for grasping by a person standing on the foot supporting member.

U.S. Pat. No. 5,947,874, by Dougherty, discloses an exercise device for simulating elliptical motion of stair climbing, including a frame having a front support and a rear support, and with upper and lower exercise units. The front support and rear support meet at an apex where they form an acute angle. The exercise units each include a pair of elliptical guide tracks which each form a closed loop. A pair of actuating levers is each attached onto the guide tracks by a partial sleeve which is capable of travel around the loop. Each exercise unit also includes a flywheel assembly which has two pairs of flywheels mounted to the rear support. Each flywheel is attached to one of the actuating levers by a connecting lever. The flywheels are shaped and the connecting levers are connected to the flywheels so as to permit elliptical motion of the actuating levers around the guide track.

Sterns et al., in U.S. Pat. No. 6,030,320, describe an exercise apparatus having a linkage assembly which links rotation of a crank to the generally elliptical movement of a force receiving member. The apparatus may be folded into a storage configuration having an overall height which is less than the greater of the diameter of the crank and the diameter of a flywheel which rotates together with the crank.

In U.S. Pat. No. 6,080,086, Maresh et al. disclose an exercise apparatus that links rotation of a crank to the generally elliptical motion of a foot supporting member. In particular, both a foot supporting linkage and a draw bar linkage are movably connected between a rocker link and the crank in such a manner that the foot supporting member is constrained to move through an elliptical path of motion. The configuration of the elliptical path may be selectively altered by adjusting the draw bar linkage relative to the rocker link.

Birrell, in U.S. Pat. No. 6,123,650, describes an exerciser including a floor engaging frame and a forward upright post structure. Toward the rear of the frame are attached left and right axle mount supports, which house a transverse axle. The axle is bifurcated allowing the two halves to rotate independently of one another and connect to left and right drive wheels, respectively. Left and right foot link members rollably engage the drive wheels at the link member's rear end portions. The forward end portions of the foot link members rollably engage left and right inclinable guide ramps. The inclinable guide ramps are biased rotationally upwardly, to resist downward forces, by biasing members, such as springs. Left and right foot support portions are mounted on the foot link members. As the foot link members reciprocate forwardly and rearwardly along the inclinable guide ramps, the interaction of the oscillating weight of a running or walking user, together with the independently upwardly biased inclinable guide ramps, causes the foot support portions to travel along an elliptical path.

U.S. Pat. No. 6,165,107 by Birrell describes an exerciser that includes a floor engaging frame. Toward the rear of the frame are attached left and right axle mount supports that house a transverse axle. The axle connects the left and right drive wheels. Rear portions of left and right foot link members rollably engage the drive wheels. Front portions of the foot link members rollably engage left and right inclinable guide ramps. The inclinable guide ramps are biased rotationally upwardly by a ramp return assembly that causes one ramp to pivot downwardly as the other ramp pivots upwardly. Forward and rearward pulley and belt systems are connected to the foot links and provide flexibly coordinated motion which substantially relates the movement of the first and second foot links to each other, while permitting some degree of uncoordinated motion between the foot links. When the foot link members reciprocate along the inclinable guide ramps, the interaction between the oscillating weight of a user and the upwardly biased guide ramps causes the foot support portions to travel along elliptical paths.

Maresh et al., in U.S. Pat. No. 6,248,046, describe an exercise apparatus that links rotation of a crank to generally elliptical motion of a foot supporting member. In particular, both a foot supporting linkage and a draw bar linkage are movably connected between a rocker link and the crank in such a manner that the foot supporting member is constrained to move through an elliptical path of motion. The configuration of the elliptical path may be selectively altered by adjusting the draw bar linkage relative to the rocker link.

In U.S. Pat. No. 6,277,055, Birrell et al. disclose a flexibly coordinated stationary exercise device that includes a frame which has a forward upright member. The axle mounts are attached to the rear region of the frame and support a transverse axle which is preferably operatively connected to a flywheel. The ends of the transverse axle rotatably engage left and right crank arm assemblies that are coupled to the left and right foot links, so that the foot links travel in an arcuate reciprocal path as the transverse axle rotates. The foot links are operatively connected to swing arm mechanisms, which in turn are rotatably connected to the forward upright member at separate pivot points. The swing arm mechanisms further contain hand-gripping portions, and the foot links further contain foot support portions. Flexibly coordinating members are incorporated in the linkage between each respective hand-gripping portion and foot support portion to substantially and resiliently link the movement of the foot support portions to the movement of the hand-gripping portions, while permitting some degree of uncoordinated motion between the foot support portions and the hand-gripping portions.

Stearns et al., in U.S. Pat. No. 6,340,340, describe an exercise apparatus that includes a crank rotatably mounted on a frame and an axially extending support connected to the crank at a radially displaced location. A foot supporting member is movably interconnected between the axially extending support and the frame. A linkage assembly links rotation of the crank to movement of a foot platform through a generally elliptical path.

U.S. Pat. No. 6,416,442 by Stearns et al. disclose an exercise apparatus having a linkage assembly which links rotation of a crank to generally elliptical movement of a foot supporting member. The crank rotates about a crank axis relative to a frame and a distal portion of a link moves relative to a connection point on the frame. An intermediate portion of the link is rotatably connected to the crank, and an opposite distal portion of the link is rotatably connected to a rearward end of the foot supporting member. An opposite, forward end of the foot supporting member is movably connected to the frame.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

SUMMARY OF THE INVENTION

The invention is directed to a stationary exercise device comprising a frame member which has a transverse pivot axis defined relative to the frame member. A first and a second foot tread member are present, each having first and second ends, with each foot tread member first end operatively associated with a coupling member for pivotally coupling the first end of each foot tread member to the transverse pivot axis at a predetermined distance there from, so that each foot tread member first end travels in an arcuate path about the transverse pivot axis. Each foot tread member moves independently of the other foot tread member at both the first end and the second end. Each foot tread member second end moves in a reciprocating path of travel, as each foot tread member first end travels in an arcuate path.

In a preferred embodiment, the stationary exercise device comprises a frame member having a transverse pivot axis defined relative to the frame member. A first and a second foot tread member are present, each foot tread member having first and second ends. Each foot tread member first end is operatively associated with a coupling member for pivotally coupling the first end of each foot tread member to the transverse pivot axis at a predetermined distance from the transverse pivot axis, so that each foot tread member first end travels in an arcuate path about the transverse pivot axis. At least one pair of wheel members is disposed for rotation about the transverse pivot axis, with each wheel member of the at least one pair of wheel members comprising a coupling member with the first end of each foot tread member pivotally affixed to one wheel member of the at least one pair of wheel members. Each foot tread member moves independently of the other foot tread member. Each foot tread member second end is operatively associated with a glide member for moveable coupling of the second end of each foot tread member to the frame member. The glide members direct each foot tread member second end along a reciprocating path of travel, as each foot tread member first end of the same foot tread member travels in an arcuate path.

BRIEF DESCRIPTION OF THE DRAWINGS

FIG. 1 is a perspective view of one embodiment of the exercise device of present invention.

DESCRIPTION OF THE EMBODIMENTS

Figure 2:
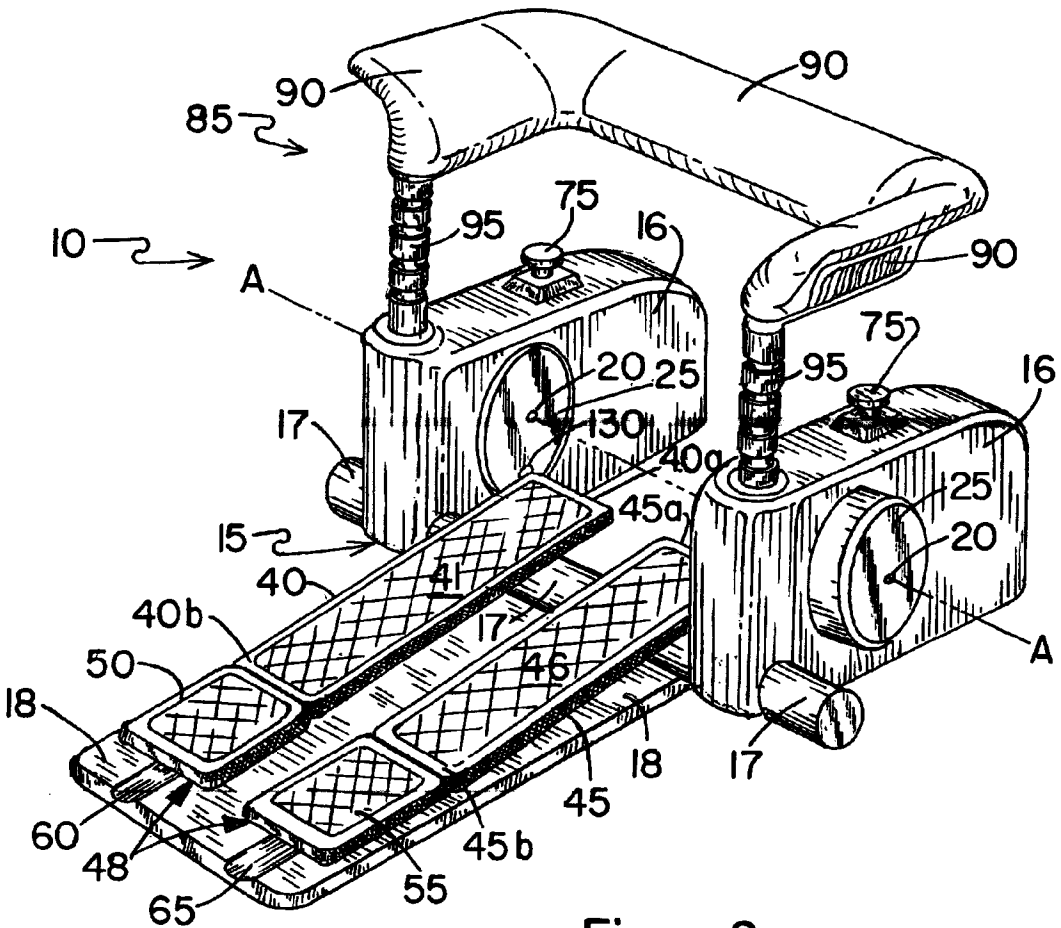
FIG. 2 is a perspective view of another embodiment of the exercise device of present invention.

| Nomenclature | |
|---|---|
| 10 | Exercise Device |
| 15 | Frame Member |
| 16 | Frame Housings |
| 17 | Rigid Connector Member |

-continued

DESCRIPTION OF THE EMBODIMENTS

| Nomenclature | |
|---|---|
| 18 | Planar Plate Member |
| 20 | Axial Shaft |
| 25 | Rotating Wheel Member |
| 30 | Bell Crank |
| 35 | Bell Crank |
| 40 | Foot Tread Member |
| 40a | First End of Foot Tread Member |
| 40b | Second End of Foot Tread Member |
| 41 | Foot Pad Portion |
| 45 | Foot Tread Member |
| 45a | First End of Foot Tread Member |
| 45b | Second End of Foot Tread Member |
| 46 | Foot Pad Portion |
| 48 | Glide Members |
| 50 | Wheeled Glide Member |
| 55 | Wheeled Glide Member |
| 57 | Wheels |
| 60 | Linear Track Portion |
| 65 | Linear Track Portion |
| 70 | Friction Brake Member |
| 75 | Brake Adjustment Knob |
| 85 | User Support Member |
| 90 | U-Shaped Portion of Support Member |
| 95 | Legs of Support Member |
| 125 | Fly Wheel Member |
| 130 | Spindle Member |
| 135 | Spindle Member |
| 140 | Fly Wheel Belt Member |

CONSTRUCTION

Referring to the FIG. 1, one embodiment of the exercise device 10, structured in accord with the principles of the present invention, is illustrated. The exercise device 10 includes a frame member 15 adapted for being supported on a floor or other such surface. The frame member 15 has a pivot axis, A, defined therein, for example, by one or more shafts 20 passing through and supported by the frame member 15. In the embodiment illustrated in FIG. 1, the shafts 20 each have a rotating wheel member 25 supported thereupon for rotation about the pivot axis A. The frame member 15 includes housings 16 supporting the shafts 20 and rotating wheel members 25, with the housings 16 joined by a rigid connector member 17 for holding the housings 16, shafts 20 and rotating wheel members 25 in a constant orientation. The frame member 15 also includes a planar plate member 18 described below. The exercise device 10 further includes a first and a second bell crank 30, 35, pivotally mounted for rotation about the axis A. The exercise device 10 further includes a first and a second foot tread member, 40, 45, respectively. The second bell crank 35 is shown in phantom in FIG. 1. The foot tread members 40, 45 are generally elongated members having a first end 40a, 45a, respectively, pivotally connected to the coupling member, (in this instance the bell cranks 30, 35) in such a manner so as to permit travel of the first ends 40a, 45a of the foot tread members 40 and 45 in an arcuate path of travel about the pivot axis A at a predetermined length corresponding to the length of the bell cranks 30, 35. Within the context of this application, "arcuate" will refer to a circular, oval, elliptical or other such closed, curved path of travel.

A second end 40b, 45b of the foot tread members 40 and 45, moves in a reciprocating path of travel as each foot track member 40, 45 travels in an arcuate path. The second ends 40b, 45b of the foot track members 40, 45 may be suspended by cables, rods, straps, belts or similar suspension means, or may simply ride directly on a suitable support surface associated with the planar plate member 18. Preferably, the second end 40b, 45b of the foot tread members 40 and 45, respectively, terminate in glide members 48 that ride on a suitable support surface. Within the context of this application, a "glide member" is defined as an element having a sliding, gliding, rolling or otherwise friction reducing function, yet including a support and guiding function for the foot tread member second ends 40b, 45b. In the present embodiment of FIG. 1, the glide members 48 comprises wheeled member 50, 55, best seen in FIGS. 5 and 6. Other embodiments of the glide members 48 secured to the foot tread member second ends 40b, 45b, include Teflon® glides, pin glides, ball glides, belt glides, hydraulic supports and other equivalent elements that provide a function of reducing friction. In the embodiment of FIG. 1, most preferably, the wheeled members 50,55 engage linear tracks 60, 65. The tracks 60, 65 direct the wheeled members 50, 55 and, consequently, the second end 40b, 45b of the foot tread members 40, 45 in a reciprocal path of travel, as the first ends 40a, 45a of the tread members 40, 45 travel about the transverse pivot axis A. Preferably, the linear tracks 60, 65 are located on the surface of the planar plate member 18 of the frame member 15. Within the context of this application, a "reciprocal" path of travel is meant to define any back and forth path of travel which is repetitively traversed by the second ends 40b, 45b of the foot tread members 40, 45, and includes a generally linear path of travel as is provided by the tracks 60, 65 of the FIG. 1 embodiment shown herein. It is important to note that each foot track member 40, 45 moves independently of each other. The force applied to one foot track member by a user in no way influences the movement of the other foot track member. This configuration allows the foot track members 40, 45 to move in tandem or in unison. Additionally, the independence of each foot track member 40, 45 allows each to move in the same direction, i.e., clockwise or counter clockwise, or one to move clockwise and the other to move counter clockwise. This feature of the present invention provides for greater versatility in the number and complexity of exercises and movements available to the user.

Figure 6:
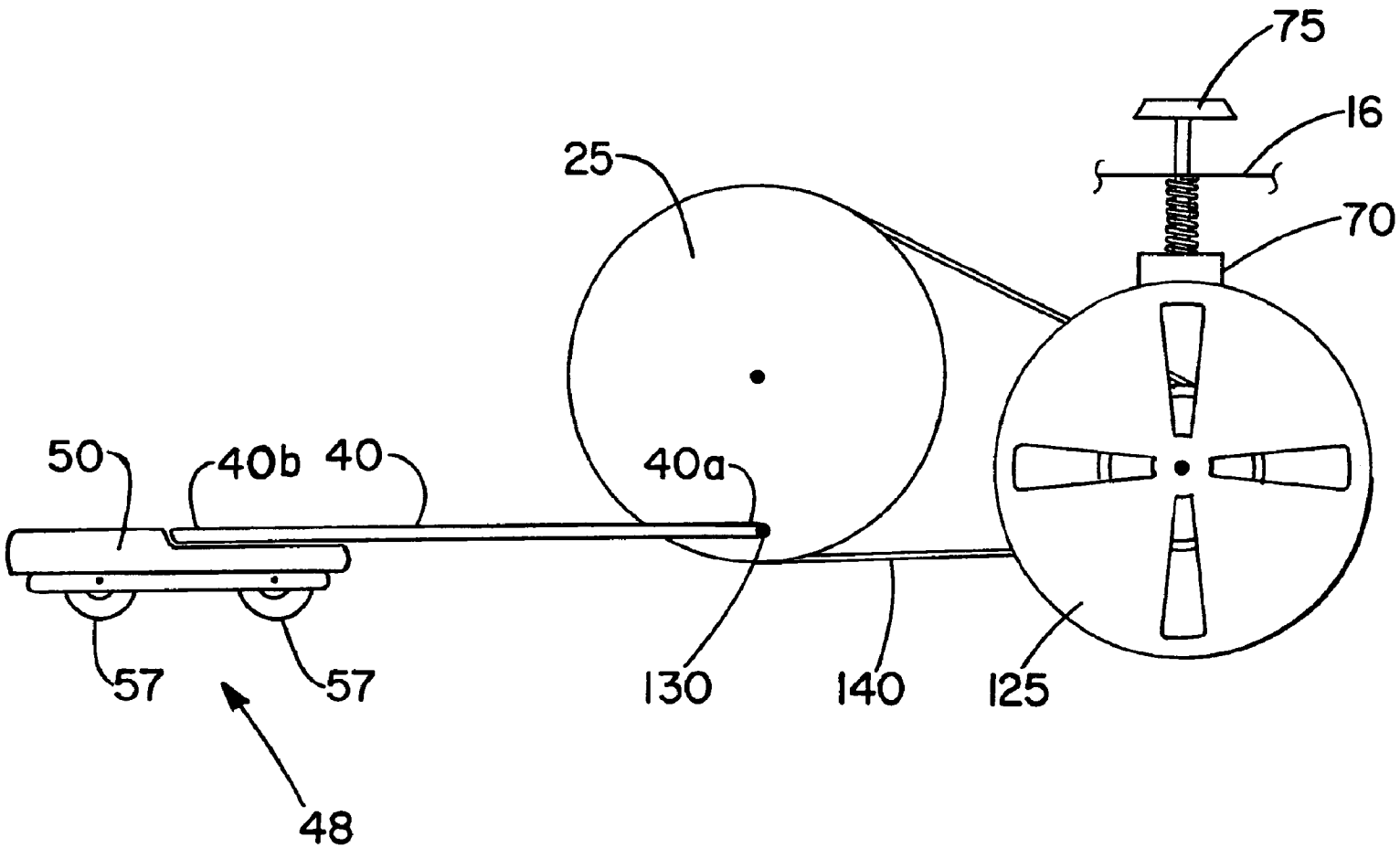
FIG. 6 is a side view of the foot pad member connected to the wheeled glide member and fly wheel mechanism of one embodiment of the exercise device of the present invention.

The apparatus of the FIG. 1 embodiment may further include friction brakes 70 associated with each rotating wheel member 25 for purposes of imposing drag on the wheel 25 so as to increase the amount of exercise provided by the exercise apparatus 10, as illustrated in FIG. 6. The friction brakes 70 are enclosed within the frame housings 16 and may be adjusted by an adjustment knob 75 operating upon the friction pad of the brake assembly, as is well known to those of skill in the art. Other types of braking devices such as a magnetic brake, a hydraulic brake link, or any other physical braking system, may be similarly employed. In the illustrated embodiment, the frame member 15 includes a user support member 85 mounted upright to the frame member 15. Preferably, the user support member 85 includes a U-shaped portion 90 with a pair of vertical legs 95, each leg 95 adjustably secured to one of the two housings 16 of the frame member 15.

Figure 3:
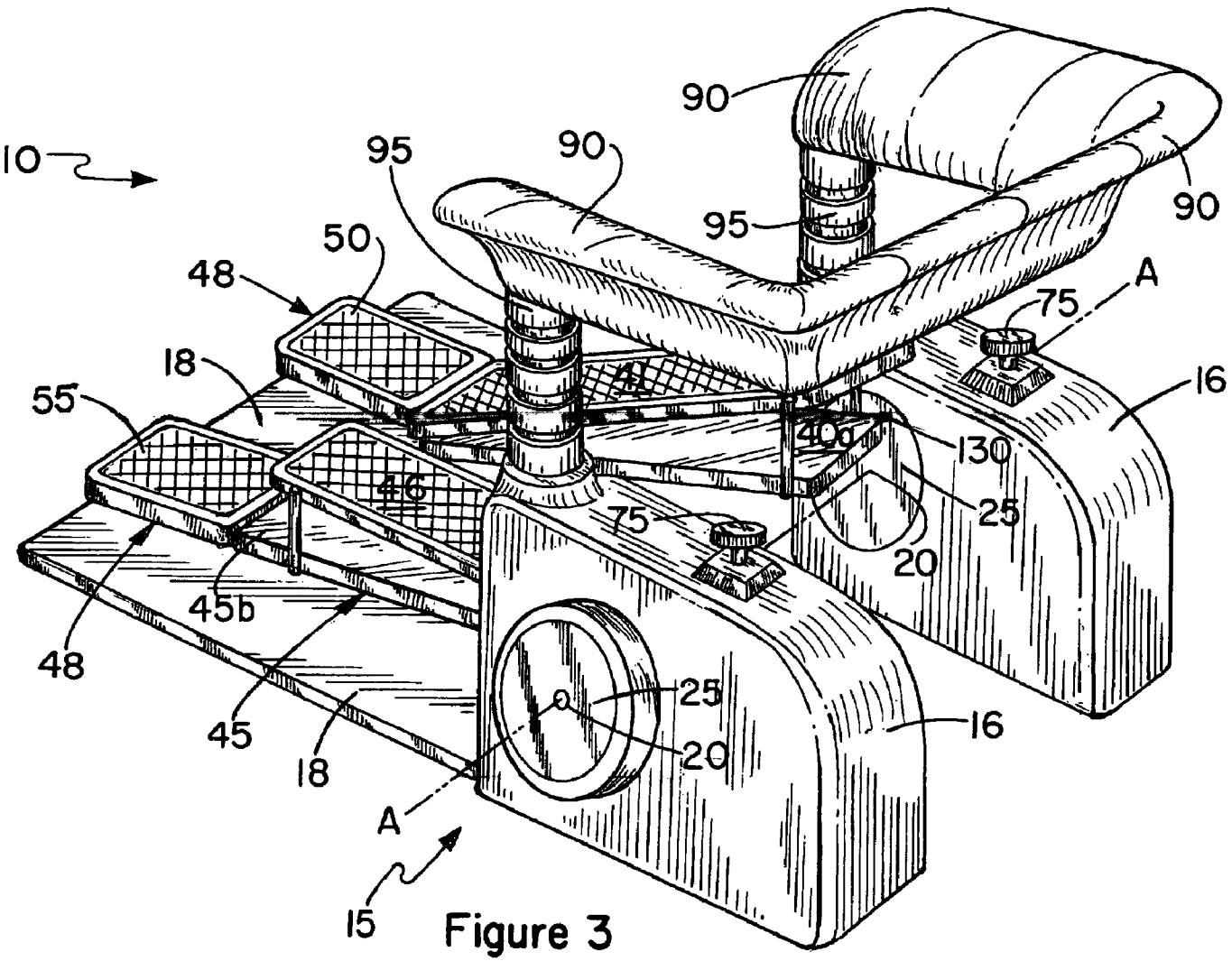
FIG. 3 is another perspective view of the FIG. 2 embodiment of the exercise device of the present invention.

The FIG. 1 embodiment of the exercise device 10 further includes foot pads 41, 46, which preferably comprise pads formed at least partially of a relatively soft, high coefficient of friction material, such as rubber, polymer, natural padding, or synthetic material. Each foot pad 41, 46 rests atop the lower foot tread 40, 45, and either end of each foot pad 41, 46 can be elevated relative to the lower foot tread 40, 45, as illustrated in FIG. 3. The foot pads 41, 46 are sufficiently rigid so as to support the weight of the user, with one end of the foot pads 41, 46 elevated relative to the foot tread 40, 45. The lower foot treads 40, 45 remains pivotally attached to the wheeled members 50, 55 when one end of the foot pads 41,46 is elevated relative to the foot treads 40,45. That is, because of a hinge or flexure between each lower foot tread 40, 45 and each wheeled member 50, 55, the angle of elevation of a foot tread 40, 45 may change with respect to the angle of elevation of an attached wheeled member 50,55. The feature of changing the orientation of the foot pads 41,46 with respect to the wheeled members 50,55 provides greater versatility in the configuration of the exercise apparatus 10 of the present invention.

Another feature of the present invention is the variable path of travel that the user's feet experience, depending upon the location of each foot on the elongated foot treads 40, 45. When positioned near the foot tread first ends 40a, 45a, the user's feet travel in a nearly circular path. When positioned near the foot tread second end 40b, 45b, the user's feet travel in an elliptical path. Thus, greater versatility in exercise is available, depending upon the location of the user's feet on the elongated foot tread 40, 45.

Referring now to FIGS. 2-4 and 6, another embodiment of the exercise device 10 of the present invention is shown. The exercise device 10 includes a frame member 15 adapted for being supported on a floor or other such surface. The frame member 15 has a pivot axis, A, defined therein, as for example by one or more shafts 20 passing through and supported by the frame member 15. In the embodiment illustrated in FIGS. 2-4, the shafts 20 each have a rotating wheel member 25 supported thereupon for rotation about the pivot axis A. The frame member 15 includes housings 16 which support the shafts 20 and rotating wheel members 25, with the housings 16 joined by a rigid connector member 17 for holding the housings 16, shafts 20 and rotating wheel members 25 in a constant orientation. The frame member also includes a planar plate member 18 described below. The exercise device 10 further includes a first and a second spindle 130, 135, pivotally mounted to each rotating wheel member 25 for rotation about the axis A. The exercise device 10 further includes a first and a second foot tread member, 40, 45, respectively. The foot tread members 40, 45 are generally elongated members having a first end 40a, 45a, respectively, which are pivotally connected to the coupling member (in this instance the spindles 130, 135) in such a manner so as to permit travel of the first ends 40a, 45a of the foot tread members 40 and 45 in an arcuate path of travel about the pivot axis A at a predetermined length, corresponding to the distance of the spindles 130, 135 from the axis of the rotating wheel members 25. Within the context of this application, "arcuate" will refer to a circular, oval, elliptical or other such closed, curved path of travel.

A second end 40b, 45b of the foot tread members 40 and 45, moves in a reciprocating path of travel as each foot track member 40, 45 travels in an arcuate path. The second ends 40b, 45b of the foot track members 40, 45 may be suspended by cables, rods, straps, belts or similar suspension means, or may simply ride directly on a suitable support surface associated with the planar plate member 18. Preferably, the second end 40b, 45b of the foot tread members 40 and 45, respectively, terminates in a glide member 48 having a sliding, gliding, rolling or otherwise fiction reducing function, yet including a support and guiding function for the foot tread member second ends 40b, 45b. In the present embodiment of FIGS. 2-6, the glide members 48 comprises wheeled member 50, 55 best seen in FIGS. 5 and 6. Other embodiments of the glide members 48 secured to the foot tread member second ends 40b, 45b, include Teflon® glides, pin glides, ball glides, belt glides, hydraulic supports and other equivalent elements that provide a function of reducing friction. In the embodiment of FIGS. 2-6, the wheeled members 50, 55 engage linear tracks 60, 65. The tracks 60, 65 direct the second ends 40b, 45b of the foot tread members 40, 45 in a reciprocal path of travel as the first ends 40a, 45a of the tread members 40, 45 travel about the pivot axis A. Preferably, the linear tracks 60, 65 are located on the surface of the planar plate member 18 of the frame member 15. Within the context of this application, a "reciprocal" path of travel is meant to define any back and forth path of travel which is repetitively traversed by the end of the foot tread members 40, 45 and includes a generally linear path of travel, as is provided by the tracks 60, 65 of the FIGS. 2-4 embodiment shown herein. It is important to note that each foot track member 40, 45 moves independently of the other foot track member. The force applied to one foot track member by a user in no way influences the movement of the other foot track member. This configuration allows the foot track members 40, 45 to move in tandem or in unison. Additionally, the independence of each foot track member 40, 45 allows each to move in the same direction, i.e., clockwise or counter clockwise, or one to move clockwise and the other to move counter clockwise. This feature of the present invention provides for greater versatility in the number and complexity of exercises and movements available to the user.

Figure 4:
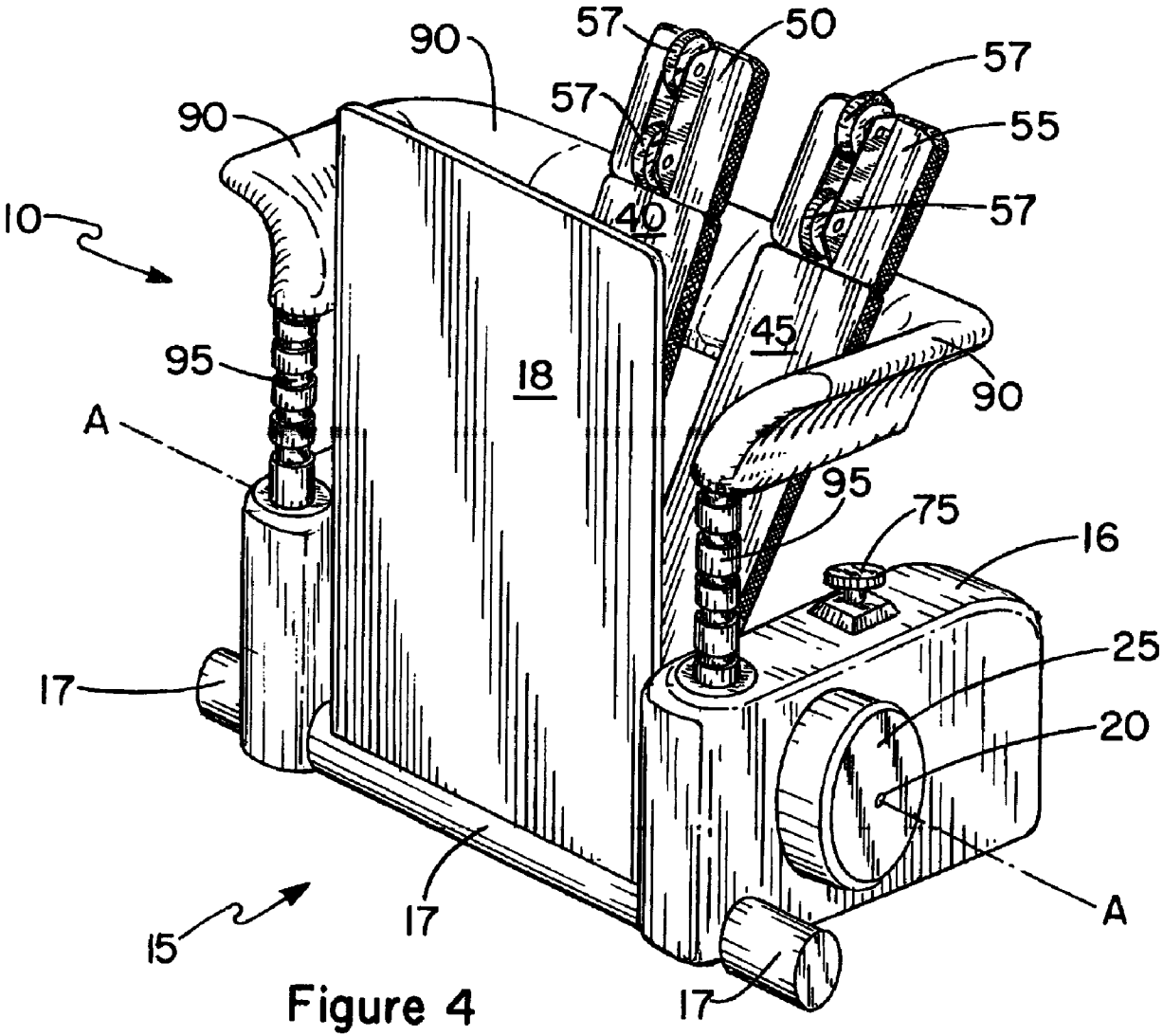
FIG. 4 is a perspective view of the FIG. 2 embodiment of the exercise device of the present invention when it is folded for storage.

The apparatus of the FIGS. 2-4 embodiment may further include friction brakes 70, associated with each rotating wheel member 25, for purposes of imposing drag on the wheel 25 so as to increase the amount of exercise provided by the exercise apparatus 10, as illustrated in FIG. 6. The friction brakes 70 are enclosed within the frame housing 16 and may be adjusted by an adjustment knob 75 operating upon the friction pad of the brake assembly, as is well known to those of skill in the art. Other types of physical, mechanical or electrical braking devices such as a magnetic brake, hydraulic brake, friction brake, and the like, may be similarly employed. In the illustrated embodiment, the frame member 15 includes a user support member 85 mounted upright to the frame member 15. Preferably, the user support member 85 includes a U-shaped portion 90 with a pair of vertical legs 95, each leg 95 adjustably secured to one of the two housings 16 of the frame member 15.

The FIGS. 2-4 embodiment of the exercise device 10 further includes foot pads 41, 46 which preferably comprise pads formed at least partially of a relatively soft, high coefficient of friction natural or synthetic material, such as rubber. Each foot pad 41, 46 rests atop the lower foot tread 40, 45, and one end of each foot pad 41, 46 can be elevated relative to the lower foot tread 40, 45, as illustrated in FIG. 3. The foot pads 41, 46 are sufficiently rigid so as to support the weight of the user with one end of the foot pads 41, 46 elevated relative to the foot tread 40, 45. The lower foot treads 40, 45 remains pivotally attached to the wheeled members 50, 55 when one end of the foot pads 41, 46 are elevated relative to the foot treads 40, 45. The feature of changing the orientation of the foot pads 41, 46 provides greater versatility in the configuration of the exercise apparatus 10 of the present invention.

Another feature of the present invention is the variable path of travel that the user's feet experience, depending upon the location of each foot on the elongated foot treads 40, 45. When positioned near the foot tread first ends 40a, 45a, the user's feet travel in a nearly circular path. When positioned near the foot tread second end 40b, 45b, the user's feet travel in an elliptical path. Thus, greater versatility in exercise is available, depending upon the location of the user's feet on the elongated foot tread 40, 45.

Referring now to FIG. 4, the planar plate member 18 of the frame member 15 containing the linear track portions 60, 65, as well as the foot tread members 40, 45, with attached wheeled members 50, 55, pivot to a near vertical orientation to allow for non-obstructive storage of the exercise device 10.

Figure 5:
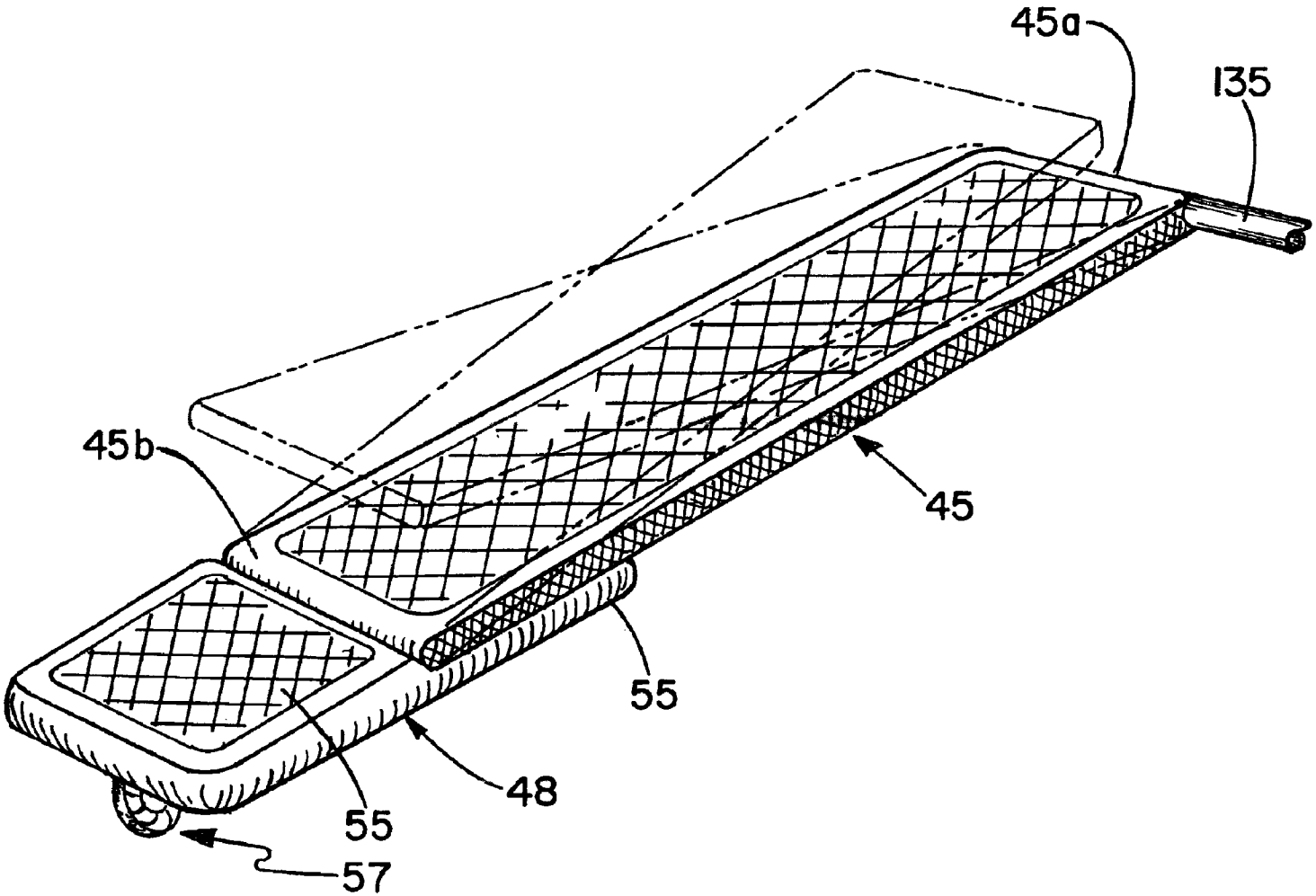
FIG. 5 is a perspective view of the foot pad member of the exercise device of the present invention.

A foot tread member 45 and attached wheeled member 55 are shown in greater detail in FIG. 5. The second end 45b of the foot tread member 45 is pivotally attached to the wheeled member 55, allowing the wheeled member 55 to remain essentially horizontal as the first end 45a of the foot tread member 45 travels in an arcuate path, attached to either the bell crank member 35 or the rotating wheel member 25, as described above. Preferably, the wheels 57 of the wheeled members 50,55 are in a linear configuration and aligned with the long axis of the foot tread members 40, 45. The wheels 57 of the wheeled members 50, 55 preferably travel in the linear track portions 60, 65 of the planar plate member 18.

Referring now to FIG. 6, a detailed view of one rotating wheel member 25, the fly wheel member 125, the attached foot tread member 40 and the wheeled member 50 is shown. The fly wheel member 125 is mounted on a shaft interior the frame housing 16 and operatively connected to the rotating wheel member 25 by a belt member 140. The friction brake member 70 is positioned to apply force to the fly wheel member 125, which transfers resistance to rotation to the rotating wheel member 25 via the belt member 140. The friction brake member 70 is adjusted with the brake adjustment knob 75 mounted on the surface of the frame housing 16. Alternatively, resistance to rotation of the wheel member 25 can be achieved by a magnet brake assembly (not shown) acting on the fly wheel member 125.

While the invention has been particularly shown and described with reference to preferred embodiments thereof, it will be understood by those skilled in the art that various changes in form and details may be made therein without departing from the spirit and scope of the invention.

I claim:

1. A stationary exercise device comprising;

(a) a frame member having a pivot axle disposed transversely relative to the frame member;

(b) a first foot tread member and a second foot tread member each having first and second ends, each foot tread member first end operatively associated with a coupling member for pivotally coupling the first end of each foot tread member to [the] *a respective* transverse pivot axle at a predetermined distance from the pivot axle, so that each foot tread member first end travels in an arcuate path about [the] *a respective* transverse pivot axle, wherein each foot tread member moves independently of the other foot tread member, and each foot tread member second end moves in a linear reciprocating path of travel as each foot tread member first end travels in an arcuate path.

2. The stationary exercise device of claim 1, wherein each foot tread member second end is operatively associated with a glide member for moveable coupling of the second end of each foot tread member to a support surface, to direct each foot tread member second end along a reciprocating path of travel as each foot tread member first end travels in an arcuate path.

3. The stationary exercise device of claim 1, wherein the coupling members comprise a first bell crank and a second bell crank, each bell crank having a bell crank first end operative to pivotally engage the first end of a respective one of the foot tread members and a bell crank second end [pivotally] affixed to the transverse pivot axle.

4. The stationary exercise device of claim 1, further including a pair of wheel members independently disposed for rotation about the transverse pivot axle.

5. The stationary exercise device of claim 4, wherein each wheel member comprises a coupling member, with the first end of each foot tread member pivotally affixed to one wheel member.

6. The stationary exercise device of claim 1, wherein each coupling member comprises a bell crank, each bell crank disposed so as to rotate with one wheel member, a first end of each bell crank pivotally connected to the first end of a respective one of the first and second foot tread members.

7. The stationary exercise device of claim 1 further including a braking mechanism operative to impose a drag upon the foot tread members as the first ends thereof travel in the arcuate path.

8. The stationary exercise device of claim 2, wherein the support surface coupled to the glide members [includes] *is part of* the frame member.

9. The stationary exercise device of claim 2, wherein the frame member includes a linear track for each glide member.

10. The stationary exercise device of claim 1 further including a support member secured to the frame member.

11. A stationary exercise device comprising;

(a) a frame member having a pivot axle disposed transversely relative to the frame member;

(b) a first and a second foot tread member each tread member having a first end and a second end, each foot tread member first end operatively associated with a coupling member for pivotally coupling the first end of each foot tread member to [the] *a respective* transverse pivot axle at a predetermined distance from the transverse pivot axle, so that each foot tread member first end travels in an arcuate path about [the] *a respective* transverse pivot axle, wherein each foot tread member moves independently of the other foot tread member, and each foot tread member second end [moves in a linear reciprocating associated] *is operatively associated* with a glide member for moveable coupling of the second end of each foot tread member to a support surface, to direct each foot tread member second end along a linear reciprocating path of travel as each foot tread member first end travels in an arcuate path.

12. The stationary exercise device of claim 11, wherein the coupling members comprise a first bell crank and a second bell crank, each bell crank having a bell crank first end operative to pivotally engage the first end of a respective one of the foot tread members and a bell crank second end [pivotally] affixed to the transverse pivot axle.

13. The stationary exercise device of claim 11 further including a pair of wheels independently disposed for rotation about the transverse pivot axle.

14. The stationary exercise device of claim 13, wherein each wheel comprises a coupling member and the first end of each foot tread member is pivotally affixed to one wheel.

15. The stationary exercise device of claim 13, wherein each coupling member comprises a bell crank, each disposed so as to rotate with one wheel member, a first end of each bell crank being pivotally connected to the first end of a respective one of the first foot tread member and second foot tread member.

16. The stationary exercise device of claim 11 further including a braking mechanism operative to impose a drag upon the foot tread members as the first ends thereof travel in the arcuate path.

17. The stationary exercise device of claim 11, wherein the support surface coupled to the glide members [includes] *is part of* the frame member.

18. The stationary exercise device of claim 11, wherein the frame member includes a linear track for each glide member, and the glide member comprises a wheeled member.

19. The stationary exercise device of claim 11 further including a support member secured to the frame member.

20. A stationary exercise device comprising;

(a) a frame member having a pivot axle disposed transversely relative to the frame member;

(b) a first and a second foot tread member each having a first end and a second end, each foot tread member first end operatively associated with a coupling member for pivotally coupling the first end of each foot tread member to [the] *a respective* transverse pivot axle at a predetermined distance from the transverse pivot axle, so that each foot tread member first end travels in an arcuate path about the transverse pivot axle, a pair of wheel members disposed for rotation about the transverse pivot [axis] *axle*, each coupling member comprising a bell crank, each bell crank disposed so as to rotate with one wheel member, a first end of each bell crank pivotally connected to the first end of a respective one of the first and second foot tread members, each foot tread member moving independently of the other foot tread member, each foot tread member second end operatively associated with a glide member for moveable coupling of the second end of each foot tread member to the frame member, to direct each foot tread member second end along a linear reciprocating path of travel as each foot tread member first end travels in an arcuate path.

21. The stationary exercise device of claim 20, wherein the frame member includes a linear track for each glide member.

*22. A stationary exercise device comprising: (a) a frame member having a pivotal axle disposed transversely relative to the frame member; (b) a first foot tread member and a second foot tread member each having first and second ends, each foot tread member first end operatively associated with a coupling member for pivotally coupling the first end of each foot tread member to a respective transverse pivot axle at a predetermined distance from the respective transverse pivot axle, so that each foot tread member first end travels independently of the other foot tread member in an arcuate path about the respective transverse pivot axle, wherein each foot tread member second end moves in a reciprocating path of travel as each foot tread member first end travels in an arcuate path.*

* * * * *